Figure 1:
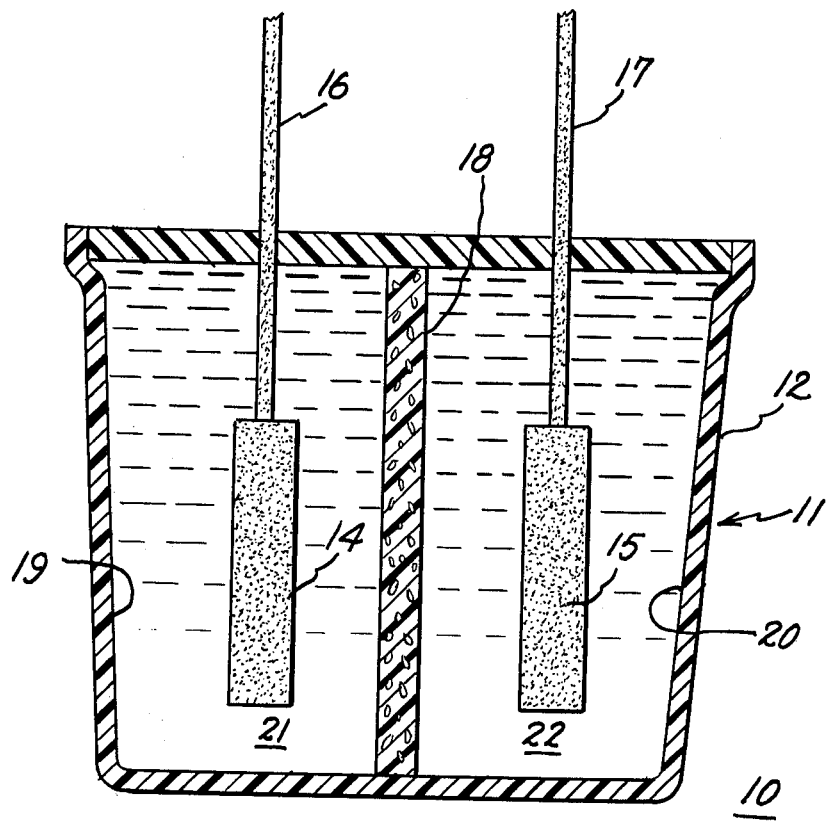

United States Patent [19]

Will

[11] 4,049,886
[45] Sept. 20, 1977

[54] RECHARGEABLE AQUEOUS METAL-HALOGEN CELL

[75] Inventor: Fritz G. Will, Schenectady, N.Y.

[73] Assignee: General Electric Company, Schenectady, N.Y.

[21] Appl. No.: 750,271

[22] Filed: Dec. 13, 1976

[51] Int. Cl.² .......................................... H01M 10/24
[52] U.S. Cl. .................................... 429/105; 429/199; 429/207; 429/212; 429/215; 429/229; 429/249
[58] Field of Search .............. 429/105, 199, 206, 207, 429/249, 229, 212, 215

[56] References Cited

U.S. PATENT DOCUMENTS

| | | | |
|---|---|---|---|
| 3,573,105 | 3/1971 | Weininger et al. | 429/105 |
| 3,653,965 | 4/1972 | Lee | 429/206 X |
| 3,816,177 | 6/1974 | Walsh | 429/194 |
| 3,879,220 | 4/1975 | Will et al. | 429/192 |
| 3,982,958 | 9/1976 | Newman | 429/194 X |

*Primary Examiner*—Anthony Skapars
*Attorney, Agent, or Firm*—Paul R. Webb, II; Joseph T. Cohen; Jerome C. Squillaro

[57] ABSTRACT

A rechargeable aqueous metal-halogen cell is described which includes a casing, a pair of spaced apart porous electrode substrates in the casing, a micro-porous separator between the electrode substrates defining a positive and a negative electrode compartment, an aqueous electrolytic solution containing a zinc salt selected from the class consisting of zinc bromide, zinc iodide, and mixtures thereof in both compartments, and an organic halogen complexing additive of nitrobenzene in the electrolytic solution of at least the positive compartment.

6 Claims, 2 Drawing Figures

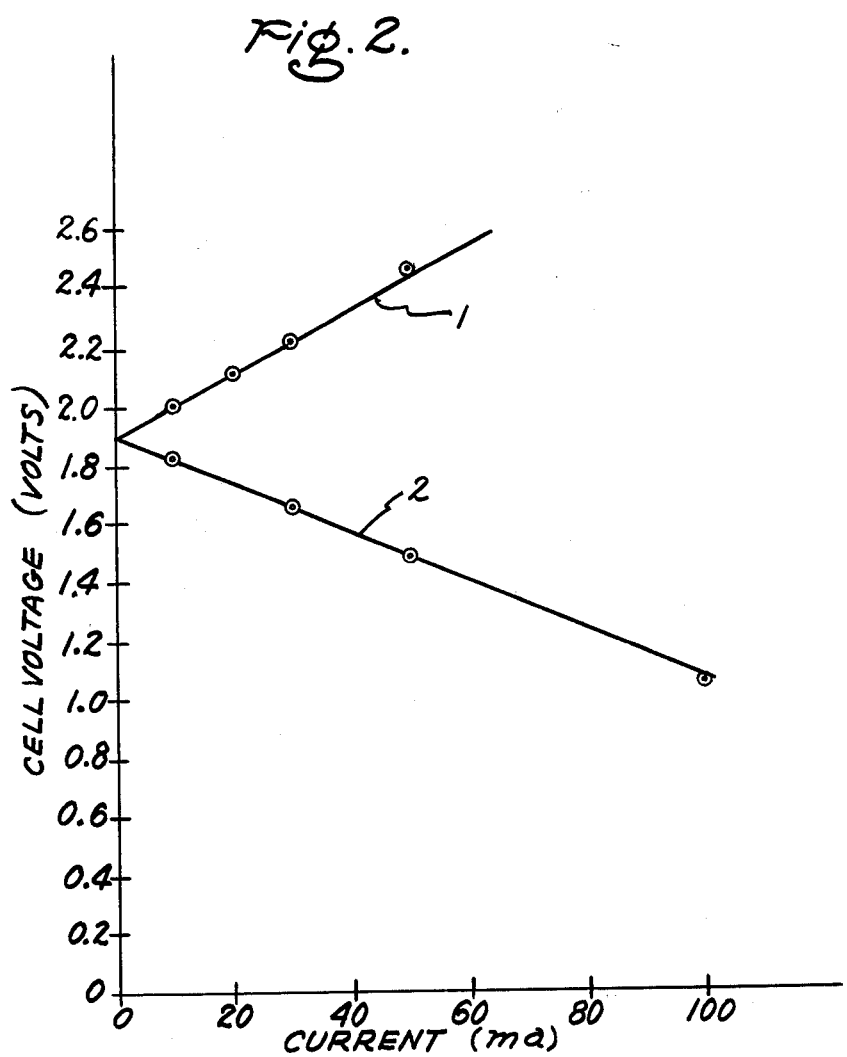

RECHARGEABLE AQUEOUS METAL-HALOGEN CELL

This invention relates to electrochemical cells and more particularly, to rechargeable aqueous metal-halogen cells.

Metal-halogen cells while disclosed in the patent literature prior to the turn of the century, have to this day, presented a number of well recognized disadvantages. A particular disadvantage of halogen electrodes is that halogens such as bromine and iodine are highly soluble is aqueous electrolyte solutions containing bromides or iodides and diffuse to the negative electrode and chemically react to self-discharge the cell. One approach to control halogen diffusion has been to interpose an ionically permeable diffusion barrier for unreacted halogen between the positive electrode and the negative electrode. Another approach has been to reduce halogen solubility and diffusion by complexing the halogen with specific organic additives. A particular disadvantage of the zinc electrode is the formation of needle-like zinc dendrites during cell charging which often lead to electrical cell shorting. An approach to reduce this problem has been to add organic compounds to inhibit dendrite growth.

In U.S. Pat. No. 3,879,220 entitled "Sealed Primary Sodium-Halogen Cell", there is described a non-rechargeable sealed cell including a sodium type anode, a solid ion-conductive electrolyte separating the anode from the cathode, and a cathode comprising a halogen selected from the class consisting of bromine, iodine, and mixtures thereof in a solvent of nitrobenzene. In contrast to the present invention, the above patent concerns a non-rechargeable, non-aqueous type of cell.

In U.S. Pat. No. 3,573,105 entitled "Rechargeable Non-Aqueous Alkali Metal-Halogen Electrochemical Cells", there is described a rechargeable non-aqueous, as opposed to aqueous in the present invention, alkali metal-halogen electrochemical cell which includes an alkali metal anode, a halogen cathode, a non-aqueous electrolyte, and an ion-permeable barrier to inhibit migration of halogen to the negative electrode between the electrodes.

In U.S. Pat. No. 816,177 entitled "Secondary Cells and Batteries", there is described a cell using an organic halogen complex, including a zinc anode, an aqueous zinc-containing acidic electrolyte, a quarternary ammonium halide and an organic complexing additive, such as propylene carbonate, in the electrolyte. The ammonium halide and additive are contained in a single electrolyte within the cell.

In U.S. Pat. No. 3,653,965, entitled "Rechargeable Galvanic Cell and Electrolyte Therefor", there is described a cell including a zinc anode, an aqueous zinc-containing alkaline or acidic electrolyte, and ethylene oxide polymers or their derivatives for suppressing dendrite formation during the charging cell.

In copending U.S. patent application Ser. No. 729,003, filed Oct. 4, 1976, there is described a rechargeable aqueous metal halogen cell which includes within a casing a pair of spaced apart porous electrode substrates, a fine-porous separator between the electrode substrates defining a positive and a negative electrode compartment, an electrolytic solution containing a zinc salt selected from the class consisting of zinc bromide, zinc iodide, and mixtures thereof in both compartments, and an organic halogen complexing additive in the electrolytic solution of at least the positive compartment. The organic halogen complexing additive is selected from the class consisting of ethylene glycol, diethylene glycol, triethylene glycol, propylene glycol, polyethylene glycols having a molecular weight from about 200 to 6000, alkyl ethers and alkyl esters thereof, the alkyl having from one to four carbon atoms, and polypropylene glycol having a molecular weight from about 200 to 6000, alkyl ethers and alkyl esters thereof, the alkyl having from one to four carbon atoms.

Both above U.S. Pat. No. 3,879,220 and copending application Ser. No. 729,003 are assigned to the same assignee as the present application The present invention is directed to a rechargeable aqueous metal-halogen cell including a pair of porous electrode substrates, a fine-porous separator therebetween, and an organic halogen complexing additive of nitrobenzene in the electrolytic solution of at least the positive compartment. The nitrobenzene forms an organic complex with the halogen which exhibits low water solubility and low halogen vapor pressure and can be charged and discharged reversibly on the positive electrode.

It is an object of my invention to provide a rechargeable aqueous metal-halogen cell which does not rapidly self discharge.

In accordance with one aspect of may invention, a rechargeable aqueous metal-halogen cells employs a casing, a pair of porous electrodes substrates in the casing, a microporous separator between the electrodes defining a positive and a negative electrode compartment, an aqueous electrolytic solution containing a zinc salt selected from the class consisting of zinc bromide, zinc iodide, and mixtures thereof in both compartments, and an organic halogen complexing additive of nitrobenzene in the electrolytic solution of at least the positive compartment.

These and various other objects, features, and advantages of the invention will be better understood from the following description taken in connection with the accompanying drawing in which:

FIG. 1 is a sectional view of a rechargeable aqueous metal-halogen cell made in accordance with my invention; and FIG. 2 is a graph disclosing polarization curves on charge and discharge of a cell made in accordance with my invention in which cell voltage in volts is plotted against current in milliamperes.

In FIG. 1 of the drawing, there is shown generally at 10 a rechargeable aqueous metal-halogen cell embodying my invention. Cell 10 has a casing 11 which includes a body portion 12 and a cover 13. While casing 11 is shown as a polyolefin plastic or polytetrafloroethylene, other plastic materials can be employed. The casing can also be made of glasses, or metals which include an inner liner of a polyolefin plastic. Unlined metals, such as tantalum, niobium and molybdenum can also be employed for the casing.

A pair of porous carbon electrode substrates 14 and 15 are suspended within casing 11 by carbon rods 16 and 17, respectively. Electrical leads (not shown) are connected to rods 16 and 17 and to a power source (not shown) or to an electrical load (not shown). A fine-porous separator 18, such as porous polyethylene or polypropylene, defines a positive compartment 19 containing electrode 14 and a negative compartment 20 containing electrode 15. The positive compartment 19 is the compartment which will contain bromine during the charging cycle of the cell while the negative compartment 20 is the compartment in which zinc is deposited upon its electrode 15. In the positive compartment, the porous substrate can also be made of porous metal of tantalum, niobium, or molybdenum in various forms, such as screens or foams. In the negative compartment, porous substrate 15 can also be made of porous metal of copper, tin or lead in various forms, such as screens or foams.

An aqueous acidic electrolytic solution, containing zinc bromide and an organic halogen complexing additive of nitrobenzene is shown as 21 in positive compartment 19. A similar aqueous acidic electrolytic solution containing zinc bromide but no organic halogen additive is shown as 22 in negative compartment 20. While it is only necessary and thus preferred to add the organic halogen complexing additive to the electrolytic solution in the positive electrode compartment, it can be added on both compartments. While zinc bromide is described above for the electrolytic solution, the zinc-containing ion for the electrolyte can be selected from a zinc salt of zinc bromide, zinc iodide or mixtures thereof. The electrolytic solution will of course contain water but it may also contain one or more other salts such as potassium bromide, sodium bromide, calcium bromide or calcium chloride. I found that a preferred electrolytic solution contained, on a weight basis, 54% $H_2O$, 12% $ZnBr_2$, 12% KBr, 12% $CaCl_2$ and 10% organic halogen complex additive of nitrobenzene.

My invention is not concerned with zinc dendrite suppression but with the complexing of bromide and iodine with an organic complexing additive of nitrobenzene to prevent excessive self discharge of the cell. In fact, I found that zinc chloride will not function according to the aims of my invention. During charging of a cell containing zinc chloride, but no iodides or bromides, the chlorine will not complex with the additive of my invention. I found that only zinc bromide, zinc iodide or mixtures thereof will work in my cell. Furthermore, my cell requires only inert electrode substrates.

I found that I could complex only the halogen bromine and iodine or mixtures thereof with an organic halogen complexing additive of nitrobenzene in the positive electrode compartment of a metal-halogen aqueous cell to provide a novel secondary battery. I prefer to add the organic halogen complexing additive of nit robenzene only to the positive electrode compartment. This additive appears to be chemically and thermally more stable and, in addition, less expensive than the above-described halogen complex with a quarternary ammonium halide and an organic complexing additive, such as propylene carbonate.

The organic halogen complexing additive of the present invention is nitrobenzene. The complex formed between this additive and bromine or iodine or mixtures thereof, has a much lower vapor pressure than elemental bromine or iodine and has very low solubility in electrolytic solutions containing zinc bromide, zinc iodide or mixtures thereof. This complex can be reversibly charged and discharged in an aqueous metal-halogen cell. Formation of the halogen complex is readily accomplished by reacting the nitrobenzene directly with the halogen. The reaction is exothermic. Related aromatic compounds, such as dinitrobenzene and trinitrobenzene are explosive in character: the toluenes are even more vigorous explosives: the chlorinated and brominated nitrobenzene and nitrotoluenes are solids at ambient temperature. Therefore, all of these compounds are unsuccessful for use as bromine complexing additives.

The activity of elemental bromine is greatly reduced by complex formation with nitrobenzene. This results in three major advantages: (1) The vapor pressure of bromine is lowered by almost two orders of magnitude, (2) the stability of the complex at elevated temperatures is increased, and (3) the corrosiveness of bromine is greatly reduced, making possible the use of metals and plastics that cannot be used in contact with elemental bromine or bromine in aqueous solutions not containing the complexing additive. The sacrifice in cell voltage, accompanying the lower bromine activity is but small; an order of magnitude decrease in activity lowers the cell voltage by only 30 millivolts. The solubility of a bromine-nitrobenzene complex in aqueous zinc bromide solutions, which is desired to be as small as possible, lies between a fraction of one percent and several percent. In a zinc-bromine cell, bromide salts are required in an aqueous solution to provide sufficient $Br_2$ solubility by the formation of $Br_3^-$-ions. However, without sufficient $Br_2$ solubility in the aqueous solution, the cell does not function properly. An expensive separator between the electrodes in the cell is required to prevent the diffusion of the $Br_3^-$-ions to the negative zinc electrode and subsequent chemical reaction to form zinc bromide. No electrical energy is produced in this chemical reaction, resulting in useless self discharge of the cell. As opposed to these previous zinc-bromine cells, the cell of the present invention can employ an inexpensive micro-porous separator in addition to the organic halogen complexing additive.

With the addition of the above organic halogen complexing additive of my invention to the electrolytic solution in both compartments and preferably to the positive compartment of the cell, the solubility of the $Br_3^-$-ion in the aqueous electrolyte is reduced sharply upon cell charging because of the complexing of the halogen with the additive. Nevertheless, the cell functions well as long as the halogen complex is in contact with the positive electrode. The additive can be employed in an amount of 1 to 90% by weight, but preferably in an amount from 5 to 50 weight percent of the electrolytic solution. Upon charging of the cell, bromine is evolved, reacts at the positive electrode substrate to form an organic halogen complex electrode which ties up the bromine. In the negative compartment, zinc is deposited on the negative electrode substrate to provide a zinc electrode. The complex of the halogen with the additive is not formed until the cell is charged. Instead of an expensive ion exchange membrane, an inexpensive micro-porous separator can be employed between the electrodes. Examples for such separators are micro-porous polyolefin and polyethersulfone separators. Upon cell discharge the complex of the halogen with the additive reacts at the positive electrode and the original organic additive is formed.

Examples of rechargeable aqueous metal-halogen cells made in accordance with my invention are set forth below:

EXAMPLE I

A glass cell was assembled including a glass casing and a glass cover. A pair of porous carbon electrode substrates, each with an apparent surface area of 4 $cm^2$ and connected to carbon rods, were inserted into the casing portion and spaced apart. A microporous polypropylene separator of 0.001 inch thickness was inserted into the casing between the electrodes to define a positive compartment and a negative compartment. The positive compartment was filled with an aqueous acidic electrolytic solution containing 54% $H_2O$, 12% $ZnBr_2$, 12% KBr, 12% $CaCl_2$ and 10% nitrobenzene by weight. The negative compartment was filled with an aqueous electrolytic solution containing 64% $H_2O$, 12% $ZnBr_2$, 12% KBr and 12% $CaCl_2$ by weight. No organic halogen complex additive was added to the electrolytic solution in the negative compartment. This cell was made in accordance with my invention.

EXAMPLE II

The cell of Example I was charged at various currents up to 50 ma resulting in a charge curve 1 showing a voltage of 2.46 volts at a current of 50 ma. The cell was discharged at various currents up to 100 ma resulting in a discharge curve 2 showing a voltage of 1.06 volts at a current of 100 ma.

While other modifications of the invention and variations thereof which may be employed within the scope of the invenion have not been described, the invention is intended to include such as may be embraced with the following claims:

What I claim as new and desire to secure by Letters Patents of the United States is:

1. A rechargeable aqueous metal-halogen cell comprising a casing, a pair of spaced apart porous electrode substrates in the casing, a micro-porous separator between the electrode substrates defining a positive and a negative electrode compartment, an aqueous electrolytic solution containing a zinc salt selected from the class consisting of zinc bromide, zinc iodide and mixtures thereof in both compartments, and an organic halogen complexing additive of nitrobenzene in the electrolytic solution of at least the positive electrode compartment, the additive present in an amount from 1 to 90 weight percent of the electrolytic solution.

2. A rechargeable aqueous metal-halogen cell as in claim 1, in which both electrode substrates are porous carbon.

3. A rechargeable aqueous metal-halogen cell as in claim 1, in which the separator is a microporous polyolefin or polyethersulfone separator.

4. a rechargeable aqueous metal-halogen cell as in claim 1, in which the organic halogen complexing additive is contained in the electrolytic solution of the positive compartment.

5. A rechargeable aqueous metal-halogen cell as in claim 1, in which the zinc salt is zinc bromide.

6. A rechargeable aqueous metal-halogen cell as in claim 1, in which both electrode substrates are porous carbon, the separator is a microporous polyolefin separator, the organic halogen complexing additive is contained in the electrolytic solution of the positve compartment, and the zinc salt is zinc bromide.

* * * * *